US006941637B2

(12) United States Patent
Fukunaga et al.

(10) Patent No.: US 6,941,637 B2
(45) Date of Patent: Sep. 13, 2005

(54) METHOD OF MANUFACTURING A MOTOR COMPRISING A RARE EARTH THICK FILM MAGNET

(75) Inventors: Hirotoshi Fukunaga, Nagasaki (JP); Masaki Nakano, Nagasaki (JP); Fumitoshi Yamashita, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/092,547

(22) Filed: Mar. 8, 2002

(65) Prior Publication Data

US 2002/0158534 A1 Oct. 31, 2002

(30) Foreign Application Priority Data

Mar. 9, 2001 (JP) ........................................ 2001-066356

(51) Int. Cl.[7] ........................ H02K 15/00; H02K 15/14; H02K 15/16
(52) U.S. Cl. .............................. 29/596; 29/598; 29/607; 29/609; 148/100; 335/284; 427/128
(58) Field of Search ........................... 29/596, 598, 607, 29/609; 148/100; 335/284; 427/128; 310/168, 156.08, 42

(56) References Cited

U.S. PATENT DOCUMENTS 5,597,425 A * 1/1997 Akioka et al. .............. 148/302
5,676,998 A * 10/1997 Araki et al. ................ 427/132
5,682,670 A * 11/1997 Bell et al. .................... 29/609

FOREIGN PATENT DOCUMENTS

| JP | 5-21865 | 1/1993 | |
| JP | 6-151226 | 5/1994 | |
| JP | 8-83713 | 3/1996 | |
| JP | 9-162034 | 6/1997 | |
| JP | 9-237714 | 9/1997 | |
| JP | 09-237714 | * 9/1997 | ........... H01F/10/14 |
| JP | 11-214219 | 8/1999 | |

* cited by examiner

*Primary Examiner*—Carl J. Arbes
*Assistant Examiner*—Tim Phan
(74) *Attorney, Agent, or Firm*—Wenderoth, Lind, & Ponack, L.L.P.

(57) ABSTRACT

The method of manufacturing rare earth thick film magnet comprising a step of forming an alloy layer of 30–100 μm thick having a general formula $R_xB_yTM_z$ on a substrate by a physical deposition process, and a step of heat-treating the alloy layer to form a thick film magnetic layer having $R_2TM_{14}B$ phase as a main phase. In the general formula, R is at least one of rare earth elements, B is boron, TM is iron or its alloy partly substituted by cobalt. X is 0.1–0.2, Y is 0.05–0.2 and Z=1-X-Y. Further, the method of the present invention includes a step of laminating a plurality of alloy layers formed on a substrate together with the substrate. A motor comprising rare earth thick film magnet of the present invention is extremely small while obtaining high output.

17 Claims, 4 Drawing Sheets

METHOD OF MANUFACTURING A MOTOR COMPRISING A RARE EARTH THICK FILM MAGNET

The instant application claims priority under 35 U.S.C. § 119 to Japanese application No. 2001-66356, filed Mar. 9, 2001.

FIELD OF THE INVENTION

The present invention relates to a method of manufacturing rare earth thick film magnet, and a micro-sized high-performance motor or actuator used as a driving source in the development of miro-robots, medical instruments, space crafts or the like using rare earth thick film magnet, and a method of manufacturing same.

BACKGROUND OF THE INVENTION

Japanese Patent Laid-Open Publication No. 05-21865 discloses a method of forming rare earth thin film magnet on a substrate such as a glass substrate, quartz substrate, and silicon wafer by a spattering method. In the Publication, a method of forming a metallic layer between the substrate or the like and the rare earth thin film magnet is disclosed. A spattering method is generally employed for forming rare earth thin film magnet.

Japanese Patent Laid-Open Publication No. 06-151226 discloses a rare earth thin film magnet in that a metallic layer of about 1 to 40 nm in film thickness and an $R_2Fe_{14}B$ (R is rare earth element including Y) alloy layer of less than 5 µm in film thickness having anisotropy in the direction of film thickness are alternately laminated to form rare earth thin film magnet by a spattering method. Japanese Patent Laid-Open Publication No. 08-83713 discloses optimum manufacturing conditions in a spattering method for rare earth thin film magnet having $Nd_2Fe_{14}B$ as main phase: that is, substrate temperature of 530 to 570° C., film-formation speed of 0.1 to 4 µm/hr, and gas pressure of 0.05 to 4 Pa.

Further, Japanese Patent Laid-Open Patent Publication No. 09-162034 discloses a film magnet having multi-layer alloy film in that a hard magnetic layer comprising so-called rare earth magnet such as $Nd_2Fe_{14}B$, $SmCo_5$, Sm (Co, Fe, Cu, Zr)$_7$, $SmFe_{11}Ti$, $Sm_2Fe_{17}N_2$, and a soft magnetic layer such as Fe, Fe—Ni, Fe—Co, Fe—Si, Fe—N, Fe—B are alternately laminated. The laminated multi-layer alloy film structure comprises the hard magnetic layer having a thickness of 2 to 4 nm per layer manufactured by a spattering at a substrate temperature of 450 to 800° C. and having anisotropy in the direction of thickness; and the soft magnetic layer having a thickness of 6 to 12 nm per layer manufactured by a spattering at a substrate temperature of 150 to 650° C. and having anisotropy in the direction of thickness.

Also, Japanese Patent Laid-Open Publications No. 09-237714 and No. 11-214219 disclose a multi-layer rare earth thin film magnet of 5 to 500 nm thick, in that a soft magnetic layer and a hard magnetic layer are formed adjacent to each other in a in-plane direction of a film, and formed, for example, by a spattering method at substrate temperature of 300 to 800° C. and are strictly controlled in thickness at nm level.

However, in the manufacturing of rare earth thin film magnet by a spattering method, it is necessary to heat the substrate up to 450° C. at least, and moreover, the film-formation speed is as low as 0.1 to 4 µm/hr. Particularly, in the case of a rare earth thin film magnet having $Nd_2Fe_{14}B$ as main phase, the film thickness is limited to less than 5 µm in order to suppress the lowering of coercivity due to oxidation. Also, in the case of a multi-layer rare earth thin film magnet of 0.01–300 µm thick with the thickness of soft magnetic layer and hard magnetic layer strictly controlled at an nm level, the method of manufacturing the magnet is more complicated and less economical.

In Japanese Patent Open-Laid Publication No. 11-288812 R—Fe—B based rare earth thin film magnet (hereafter R stands for rare earth element) is disclosed which is heat-treated after film-formation by a spattering method without heating the substrate. However, this method also involves problems such that the film-formation speed is less than 4 µm/hr and that the film thickness of the magnet is limited to less than teen µm.

On the other hand, there is a strong demand for miniaturization of electromagnetic motors and actuators. The points for miniaturization of motors and actuators are to reduce the number of components and to simplify the assembly. In this respect, the mover of a miniaturized motor or actuator is generally configured by using rare earth sintered magnet manufactured by a powder metallurgical process or rare earth bond magnet manufactured by forming spun-melt magnetic powder into a specific shape with use of resin.

Also, there are two types of motors, from the positional relations of magnet and armature coil. One type is an axial air gap type wherein the magnet and armature coil have gaps in the axial direction and another type is a radial air gap type wherein the magnet and armature coil have gaps in the radial direction. However, in a case of a millimeter-sized motor or actuator (axial air gap type) of 5 mm in diameter and 1 mm in height as shown in FIG. 1, which is an object of the present invention, it is also necessary to manufacture the rare earth magnet of the mover by 300 µm or less in thickness.

In FIG. 1, reference numeral 1 shows rare earth magnet; 2 a rotary shaft; 3 a bearing; and 4 an armature coil.

The crystal grain size of R-TM(transition metal)-B based rare earth sintered magnet is generally as large as 6 to 9 µm, and since there exists an R rich layer in the grain boundary, the magnetic performance of the surface layer is deteriorated during grinding operation, reaching as deep as about several tens µm from the surface. Also, since the material is brittle and hard to process, the processing limit taking into account the yield is estimated to be about 300 to 500 µm, and it is difficult to apply to such a millimeter-sized motor as shown in FIG. 1.

On the other hand, the crystal grain size of R-TM-B based rare earth bond magnet is as small as 20 to 100 nm, and when the grain size is less than 50 µm, the coercivity tends to become more dependent on the grain size. As a result, if the magnet is thinned, it will be unable to avoid the lowering of the magnetic performance due to worsening of the powder magnetic characteristic and lowering of the magnet density. Thus, the processing limit taking into account of a maintenance of magnetic performance and a production yield is estimated to be about 300 to 500 µm.

As described above, in the case of a millimeter-sized motor or actuator, it is not possible to make use of an original magnetic performance of rare earth magnet by employing the rare earth sintered magnet or the bond magnet manufactured by bonding spun-melt rare earth magnetic powder with resin.

When a motor or actuator is miniaturized, the electromagnetic force is proportional to the third power of the dimension according to the scaling rule. Therefore, for example, when the mover (magnet) becomes reduced to 1/10 in size, the electromagnetic force is decreased to 1/1000. Accordingly, in case rare earth thin film magnet of less than 5 μm in film thickness is used as a mover, it is unable to obtain an electromagnetic force corresponding to the load in actual use.

SUMMARY OF THE INVENTION

The method of manufacturing rare earth thick film magnet of the present invention comprises a step of forming an alloy layer of 30–100 μm thick whose composition is shown by a general formula $R_XB_YTM_Z$ on a substrate by a physical deposition method, and a step of heat-treating the alloy layer to forming a thick film magnetic layer having $R_2TM_{14}B$ phase as a main phase.

Where, R is at least one of rare earth elements, B is boron, TM is iron (Fe) or its alloy with Fe partly substituted by cobalt (Co); and X=0.1–0.2, Y=0.05–0.2 and Z=1-X-Y.

Further, the manufacturing method of the present invention includes a step of laminating a plurality of the alloy layers formed on the substrate together with the substrate.

Also, using iron of more than 13 kG in saturated magnetization, including at least one element selected from the group consisting of nickel, cobalt, silicon, nitrogen and boron, as a substrate, a yoke of a mover of a motor can be produced at a same time when the rare earth thick film magnet is produced. This enables the simplification of the assembly of the motor by reducing a number of components. The above motor comprising rare earth thick film magnet of 30–500 μm thick is extremely small in size and still able to provide high output power.

DESCRIPTION OF THE PREFERRED EMBODIMENTS

Figure 1:
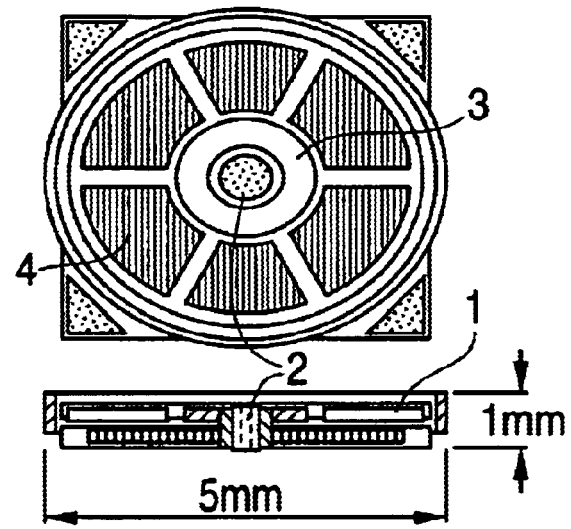
FIG. 1 shows a configuration of a motor comprising the magnet of the present invention.

The present invention is a method of manufacturing rare earth thick film magnet (hereafter referred to as "magnet") of the present invention comprises a step of forming an $R_XB_YTM_Z$ alloy layer of 30 to 100 μm in thickness on a substrate by a physical deposition method, and a step of forming at least one magnetic layer having $R_2TM_{14}B$ as a main phase by heat-treating the alloy layer.

Where, R is at least one of rare earth elements, B is boron, TM is iron (Fe) or its alloy with Fe partly substituted with cobalt (Co); and X=0.1–0.2, Y=0.05–0.2 and Z=1-X-Y.

By using a laser ablation method for the physical deposition, a film-formation speed can be increased as high as about 50 μm/hr that is more than 10 times the speed in a spattering method. As an element of R in a target alloy composition for laser ablation, it is desirable to include at least one of Nd and Pr in particular, and Nd or Pr may be partly substituted with Dy.

In the above composition, when an amount of R is less than 10 atomic % (hereafter "at %"), sufficient coercive force is not obtained, and when more than 20 at %, the energy products [(BH) max.] and the remanence (Br) decrease due to a reduction of Fe component. When B is less than 5 at %, the coercive force is lowered, and when more than 20 at %, (BH) max. and Br decrease.

The alloy composition of the target is desirable to be $R_{X2}TM_{14}B$ (X2>2) that has more R component than a stoichiometric composition of $R_2M_{14}B$ in particular, and the substrate is desirable to be a soft magnetic material selected from the group consisting of Fe of at least 13 kG in saturated magnetization, Fe—Ni, Fe—Co, Fe—Si, Fe—N, Fe—B. Further, it is possible to use soft magnetic material with Ta disposed on a substrate surface or a soft magnetic material with Ta ion-implanted to suppress an oxidation of the deposited film.

As an example of film formation conditions of the laser ablation, R-B-TM based alloy is formed under conditions such as forming speed of more than 50 μm/hr and degree of vacuum of below $10^{-6}$ Torr. After the film formation, the film is heat-treated at 650–750° C. of maximum temperature to be a 50 μm thick magnetic film having a coercivity of at least 6 kOe which can suppress the irreversible demagnetizing rate of the magnet.

Also, after the film-formation of R-B-TM based alloy, a surface of the magnetic film can be smoothed while the film is pressed in a direction of thickness and electric current is directly applied to the film to crystallize the film with a Joule heat generated (so-called direct Joule heating).

Also, after the film-formation of R-B-TM based alloy, a multi-layered magnet can be produced by laminating a plurality of the formed films while the films are pressed in a direction of thickness and electric current is directly applied to the films to crystallize the film with a Joule heat generated. In such case, a full-dense magnet having high coercivity of more than 10 kOe can be obtained by a directly electric current application heating under following conditions. A heating speed of not less than 9° C./sec., a press pressure of 200–400 kgf/cm² and a degree of vacuum not higher than 1 Torr. If the pressure is less than 200 kgf/cm², it may sometimes result in a failure of uniform heating, and if higher than 400 kgf/cm², the magnet may be excessively deformed.

An axial air gap type thick film magnet motor can be manufactured by disposing a mover and a stator opposing to each other via air gap, wherein the mover comprises above-described rare earth thick film magnet of 30–500 μm thick and a rotary shaft. Also, a thick film magnet motor comprising a flat-plate mover and a flat-plate stator can be obtained. Or a radial air gap type magnet motor manufactured by disposing a mover and a stator opposing to each other via air gap wherein the mover comprises the thick film magnet crystallized by a heat treatment after curling it on a inner wall of the mover frame, and a rotary shaft.

EXAMPLE

The present invention will be further described in detail in the following according to an example. Also it should be noted that the present invention is not limited to the example.

Figure 2:
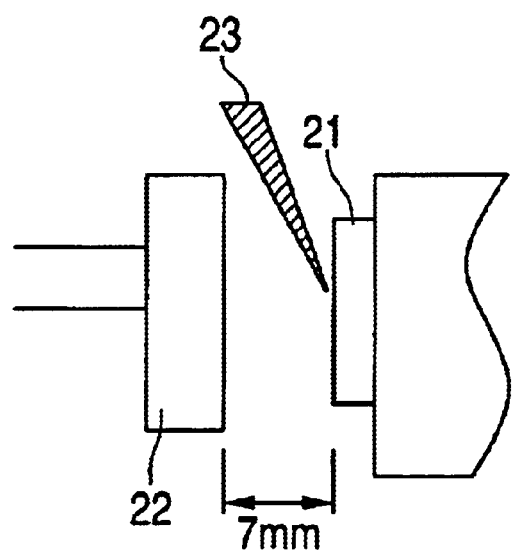
FIG. 2 is schematic diagram of an essential portion of a film-formation apparatus.

FIG. 2 is an schematic diagram illustrating an essential portion of a film-formation apparatus of the present invention.

In FIG. 2, $Nd_{2.6}Fe_{14}B$ alloy is disposed as a target 21. Opposing to the target 21 a substrate made of Ta, W, Mo, $SiO_2$, Fe, Ta, ion-inplanted Fe or the like is disposed, the substrate is 25 mm×25 mm in size and 10 μm or 100 μm in thickness. The distance between the target 21 and the substrate 22 is 7 mm.

The target 21 and the substrate 22 are disposed in a vacuum chamber, and laser beam 23 having energy of 240–340 mJ is radiated for 10–60 minutes to the target 21 under a vacuum of $5\times10^{-7}$–$2\times10^{-6}$ Torr to form an alloy layer on the substrate 22.

Figure 3:
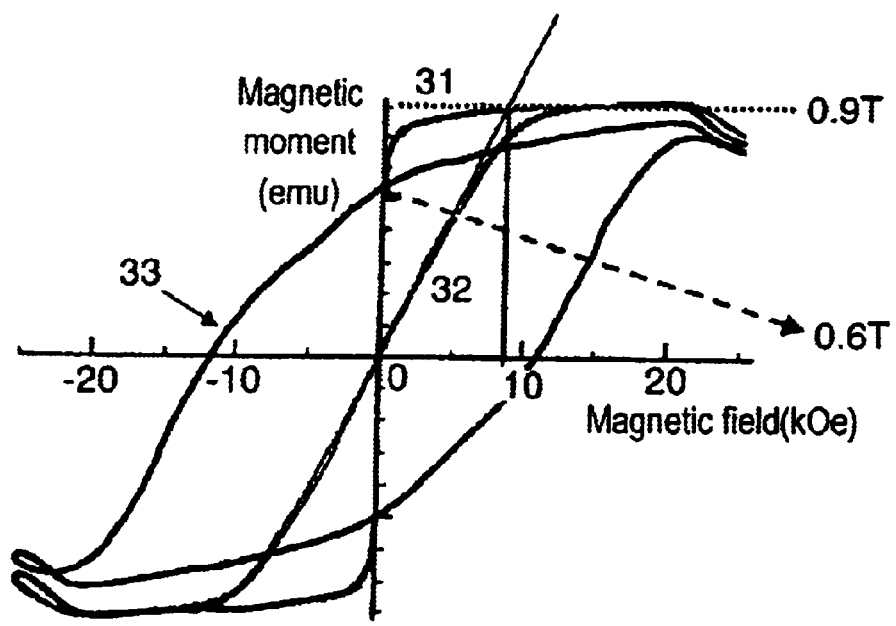
FIG. 3 shows hysteresis characteristic of a $Nd_{2.6}Fe_{14}B$ thick film after forming on Ta substrate and these of the thick film before and after heat-treating the film at 550° C.

FIG. 3 shows hysteresis characteristic of a $Nd_{2.6}Fe_{14}B$ alloy thick film after an one-hour film-formation on a Ta substrate by laser ablation and that of after a heat-treatment of the thick film at 550° C. In FIG. 3, reference numeral 31 shows in-plane hysteresis characteristic after the film-formation; 32 vertical hysteresis characteristic after the film-formation; and 33 hysteresis characteristic after the heat treatment.

In the present example, from a relation of $Hd=N/\mu 0\times 1$ (Hd is diamagnetic field; N is coefficient of diamagnetic field; μ0 is a vacuum permeability), the thickness of the film formed can be estimated to be 50 μm. That is, an alloy film-formation speed obtained is more than 10 times greater than a film-formation speed of 4 μm/hr of a conventional spattering method.

Also, at a stage before the heat treatment after the film-formation, no coercive force has been observed. However, as is apparent from the hysteresis curve 33 after 60 kOe pulse magnetizing after the heat treatment, the $Nd_{2.6}Fe_{14}B$ thick film (50 μm thick) shows a coercive force as large as more than 10 kOe.

Figure 4:
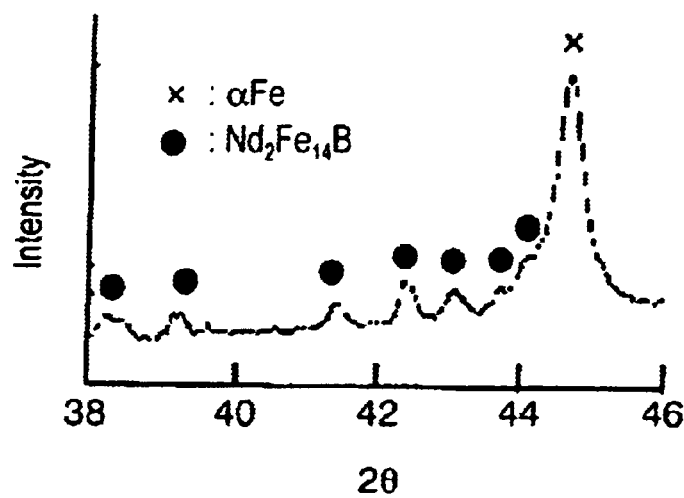
FIG. 4 is an X-ray diffraction pattern of the thick film magnet of the present invention.

A X-ray diffraction pattern of the magnetic thick film after the heat treatment is shown in FIG. 4. As is obvious from FIG. 4, though, a αFe phase also exists in the magnetic thick film, a $Nd_2Fe_{14}B$ phase is observed, and it is understood that the coercive force is due to the $Nd_2Fe_{14}B$ phase.

Figure 5:
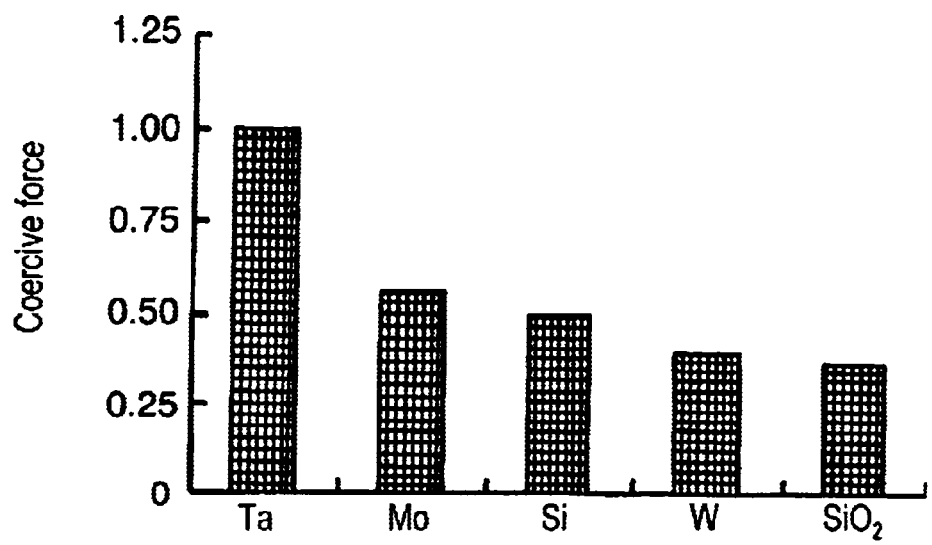
FIG. 5 is a diagram showing a relation between substrate material and coercive force after heat-treatment.

FIG. 5 is shows a relationship between the material for substrate and the coercive force after the heat treatment. Here, the coercive force is nomalized on the basis of Ta substrate as a reference. As shown in FIG. 5, Ta substrate shows the largest coercive force. Also, Fe substrate with Ta ion-implanted for modifying a surface showed almost a same coercive force as that of Ta substrate. This is supposed that an oxidation of Nd is suppressed by Ta existing on the substrate surface.

The Ta implantation can be performed, for example, by such method as disclosed in BROWN. I. G: "The Metal Vapor Vacuum-Arc (MEVVA) High Current Ion Source", IEEE Trans. on Nuclear Science, Vol. NS-32, No. 5 (1985). In this example, arc discharge is initiated in vacuum, and Ta used as cathode is vaporized and ionized, then the ion is accelerated by a grid electrode with DC 70 kV applied, and the ion beam in a state of being multi-charged is drawn out without mass separation and are directly implanted into Fe substrate of 99.98% purity. An amount of ions injected is $10^{17}$ ions/cm$^2$.

Thus, a high coercive force is obtained by using a Ta ion-implanted Fe substrate without using an expensive Ta substrate. From this high coercive force, it can be understood that a magnet obtained by the present invention is effective to reduce the number of components for a mover of an extremely small-sized motor.

Figure 6:
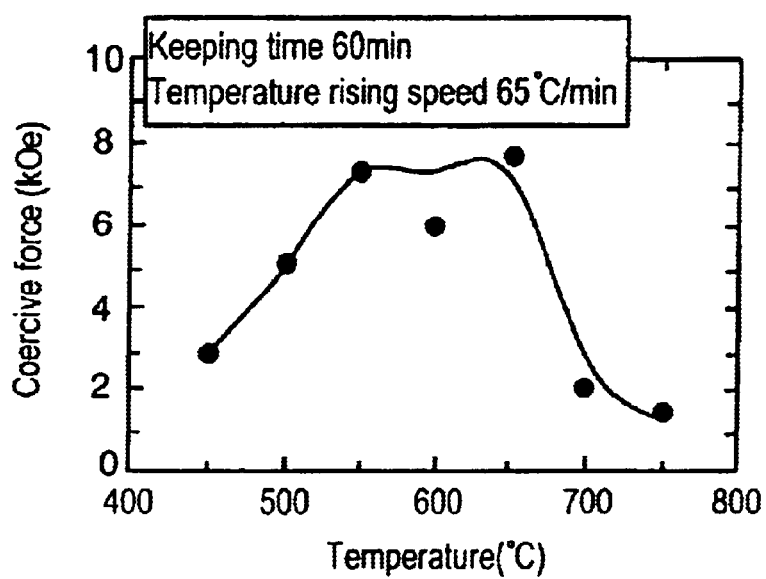
FIG. 6 is a diagram showing a relation between heat-treating temperature and coercive force.

FIG. 6 shows a relation between the heat treatment temperature and the coercive force of $Nd_{2.6}Fe_{14}B$ thick film (50 μm thick) obtained. In FIG. 6, the heat treatment temperature is 450–750° C., and the keeping time at each temperature is one hour. As is apparent from FIG. 6, when the heat keeping time is one hour, the optimum temperature for the heat treatment is around 550–650° C., and the coercive force obtained is 6 kOe or more.

Figure 7:
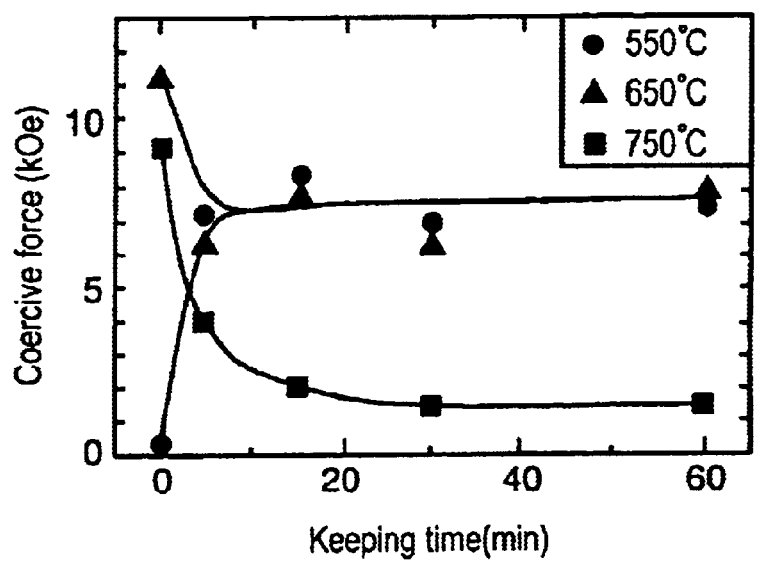
FIG. 7 is a diagram showing a relation between heat treating time and coercive force.

FIG. 7 shows a relation between a heat keeping time and the coercive force in the range of heat treatment temperature of 500–750° C. As is apparent from FIG. 7, when the heat keeping time is within one hour, the optimum temperature for heat treatment shifts to higher temperature as compared with the optimum temperature at the one hour heat keeping. Also, when the heat treatment temperature is 650–750° C., the shorter the keeping time, the larger the coercive force obtained, and the coercive force under the optimum heat-treating condition becomes larger than 11 kOe.

Figure 8:
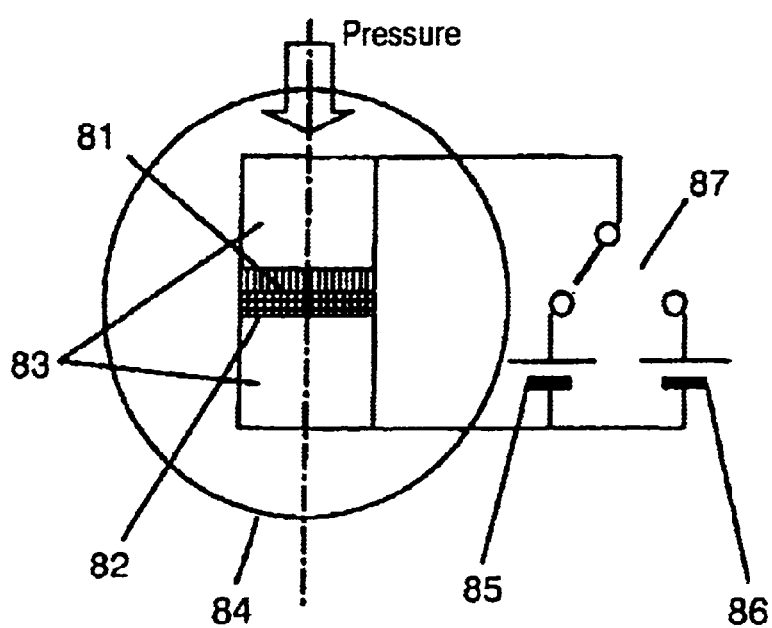
FIG. 8 is a schematic diagram of an essential portion a directly current applying high-speed heat-treating apparatus.

Then, a test of high-speed heat treatment by a directly electric current application has been conducted as shown in FIG. 8, where $Nd_{2.6}Fe_{14}B$ thick film (50 μm thick) 81 formed on Ta ion-implanted Fe substrate 82 is disposed between a pair of $TiN/Si_3N_4$ electrodes 83. The heat treatment is performed in a vacuum chamber 84, and DC current is applied from a pulse DC power 85 and a DC power 86 by switching with a changeover switch 87.

First, heating with directly electric current application in the above configuration is explained. Heat dissipation to outside the heating system will be omitted in the explanation.

Since 1W=0.2389 cal/sec., temperature rising speed dT/dt (° C./sec.) due to the current application is as follows:

$$dT/dt = 0.2389\Delta I^2 \times \rho/SC,$$

where, ΔI is a current density (A/cm$^2$); ρ is volume resisivity (Ωcm); C is specific heat (cal/° C.·g); and S is specific gravity (C×S: volume specific heat).

In other words, temperature rising speed dT/dt is in proportion to the second power of current density and volume resisivity ρ, and in inverse proportion to volume specific heat. It has no relation with an electrode distance.

Since ρ/SC at room temperature of $TiN/Si_3N_4$ used is approximately $10^{-4}$ (Ωcm$^{4.°}$ C./cal), when current density ΔI is 300 A/cm$^2$ and 400 A/cm$^2$, the high-speed heating of at 9° C./sec. and 16° C./sec., respectively, can be possible.

Then, a high speed heat treatment is performed for 30 seconds under the following conditions. First, the chamber pressure is evacuated to $10^{-2}$ Torr and DC pulse current of 0.5 second ON and 0.5 second OFF with a current density of ΔI=200 A/cm$^2$ is applied while the 50 μm thick $Nd_{2.6}Fe_{14}B$ thick film on a 10 μm thick substrate is disposed between the electrodes and pressed at 200 kgf/cm$^2$. Then a DC current of current density ΔI=300 or 400 A/cm$^2$ is applied for 70 or 40 sec. After cooling to the room temperature, the 50 μm thick $Nd_{2.6}Fe_{14}B$ thick film on a 10 μm thick substrate is taken out and a surface roughness of the thick film Rmax is measured. Each of the test piece shows a surface roughness of Rmax equivalent to a mirror finished surface of 100 nm of the electrodes, showing that a surface shape of the electrodes is transferred to the surface of the thick film. After pulse magnetizing of the thick film by a magnetic field of 60 kOe, a coercive force of 12 kOe is obtained in each test piece.

Thus, increasing the heating speed is effective to increase the coercivity of the thick film. Also, a multi-layer thick film magnet of 300 μm was obtained by laminating and heat-pressing five layers of the 50 μm thick $Nd_{2.6}Fe_{14}B$ thick film on a 10 μm thick substrate with directly current application heating under the same conditions as described above. The density of the obtained multi-layer thick film magnet is approximately 7.6 g/cm³. With volume fraction of Fe and magnet taken into account, the magnet density is estimated to be 55 g/cm³, thus, it has been confirmed that the multi-layer thick film magnet is so-called fully-dense magnet.

Next, the above multi-layer thick film magnet of 300 μm thick, 4.2 mm in diameter and 2.0 mm in bore diameter is subjected to double-pole magnetizing by pulse magnetic field of 30 kOe. A mover of 5 mm in diameter and 1 mm thick is prepared using the multi-layer thick film magnet and rotary shaft which is to be built into a millimeter-sized motor as shown in FIG. 1. For comparison, Nd—Fe—B based sintered magnet is ground to manufacture a mover having the same structure.

The motor obtains a rotational force with power sequentially applied to a 3-phase armature coil, and 3-phase signal is generated in an oscillation circuit and is applied to the armature coil. When the motor is driven by a synchronous motor driving (at 60 to 10000 rpm) in which a speed varies in accordance with the oscillation frequency, the maximum motor outputs is shown in Table 1.

TABLE 1

| Mover | Max. output (mW) |
|---|---|
| Present Example | 14 |
| Comparative example | 8 |

As is seen in Table 1, millimeter-sized magnetic motor or an actuator with high output power can be obtained by using the thick film multi-layer magnet of the present invention in a mover.

As described above, in accordance with the present invention, a thick film can be formed on a substrate at a high speed of more than 10 times the film-formation speed in a conventional spattering method. Further, a thick film magnet having a high coercive force can be obtained through a crystallizing process by high-speed heat treatment. Such rare earth thick film magnet having a high coercive force is very effective to improve the performance of millimeter-sized motors or actuators, for example, in which a high-performance magnet of less than 300 μm thick is needed. Such a small sized magnet is difficult to manufacture by grinding of sintered magnet or forming of bond magnet. The thick film magnet of the present invention reduces a man-hour for millimeter-sized motor assembling operation and a number of components.

Also, in the above embodiment, a rotary type motor was described as an example, but it should be noted that the magnet of the present invention can be used in a mover and a field magnet of an extra-small-sized linear motor, as well as for a rotary type motor.

In the above description, the composition of the thick film magnet is described as $R_XB_YM_Z$ alloy (where R is at least one of rare earth elements; B is boron; M is Fe or Fe alloy with Fe partly substituted with Co; X: 0.1–0.2, Y: 0.05–0.2 and Z=1-X-Y), but the above composition does not exclude unavoidable impurities contained in the raw material.

What is claimed is:

1. A method of manufacturing a rare earth thick film magnet comprising:
    a step forming a $R_XB_YTM_Z$ alloy layer of 30 to 100 μm in thickness on a substrate by a laser ablation process; and
    a step of heat-treating said alloy layer to form a thick film magnetic layer having $R_2TM_{14}B$ as main phase,
    where R is at least one selected from rare earth elements, B is boron, TM is iron or iron alloy partly substituted by cobalt, and X: 0.1–0.2, Y: 0.05–0.2 and Z=1-X-Y.

2. The method of claim 1, further comprising a step of laminating a plurality of said alloy thick films on said substrate.

3. The method of claim 2, wherein said heat-treating step further comprises a step of applying electric current directly to said plurality of laminated alloy thick films while said plurality of laminated alloy layers being pressing in a direction of thickness.

4. The method of claim 3, wherein said heat-treating is processed at a heating speed of higher than 9° C./second, at a pressure of 200–400 kgf/cm², and at a degree of vacuum of 1 Torr or less.

5. The method of claim 1, wherein said substrate is made of iron including at least one element selected from the group consisting of nickel, cobalt, silicon, nitrogen, and boron and having at least 13 kG in saturated magnetization.

6. The method of claim 4, wherein said substrate includes tantalum on a surface thereof.

7. The method of claim 5, wherein said substrate includes ion-implanted tantalum on a surface thereof.

8. The method of claim 1, wherein a film-formation speed in said forming alloy layer is 50 μm/hr or more.

9. The method of claim 1, wherein a degree of vacuum in said forming alloy layer is $10^{-6}$ Torr or less.

10. The method of claim 1, wherein said alloy layer is heat-treated at 650–750° C., and the coercive force of said rare earth thick film magnet is 6 kOe or more.

11. The method of claim 1, wherein said heat-treating step further comprises a step of applying electric current directly to said alloy layer while said alloy thick film being pressed in a direction of thickness.

12. The method of claim 11, wherein a surface of said alloy thick film is smoothed by said pressing.

13. A method of manufacturing a motor comprising a rare earth thick film magnet comprising:
    a step forming a $R_XB_YTM_Z$ alloy thick film of 30 to 100 μm in thickness on a substrate by a laser ablation process;
    a step of heat-treating said alloy thick film to form a thick film magnetic layer having $R_2TM_{14}B$ as main phase;
    a step of manufacturing said thick film magnet by magnetizing said thick film magnetic layer; and
    a step of building said thick film magnet into a motor,
    where R is at least one rare earth elements, B is boron, TM is iron or iron alloy partly substituted by cobalt, and X: 0.1–0.2, Y: 0.05–0.2 and Z=1-X-Y.

14. The method of claim 13, further comprising a step of laminating a plurality of said alloy layers formed on said substrate.

15. The method of claim 13, wherein said substrate is made of iron including at least one element selected from the group consisting of nickel, cobalt, silicon, nitrogen, and boron and having at least 13 kG in saturated magnetization.

16. The method of claim 13, where said substrate includes tantalum on a surface thereof.

17. The method of claim 13, wherein said substrate includes ion-implanted tantalum on a surface thereof.

* * * * *